United States Patent [19]

Miller

[11] Patent Number: 4,833,354

[45] Date of Patent: May 23, 1989

[54] OIL-FILLED SUBMERGIBLE ELECTRIC PUMP MOTOR WITH UNVARNISHED STATOR STRUCTURE

[75] Inventor: Cynthia S. Miller, Bartlesville, Okla.

[73] Assignee: TRW Inc., Cleveland, Ohio

[21] Appl. No.: 206,042

[22] Filed: Jun. 13, 1988

[51] Int. Cl.$^4$ .................... H02K 3/50; H02K 5/12
[52] U.S. Cl. .................... 310/87; 310/91; 310/260; 310/271
[58] Field of Search .................... 220/85 B; 310/45, 87, 310/88, 260, 270, 43, 91, 271

[56] References Cited

U.S. PATENT DOCUMENTS

| | | | |
|---|---|---|---|
| 3,014,191 | 12/1961 | West | 336/120 |
| 3,226,585 | 12/1965 | Roe | 310/194 |
| 3,780,323 | 12/1973 | Swain | 310/43 |
| 3,912,957 | 10/1975 | Reynolds | 310/71 |
| 3,974,407 | 8/1976 | Dochterman | 310/71 |
| 4,038,573 | 7/1977 | Hillyer et al. | 310/71 |
| 4,219,748 | 8/1980 | Sakaguchi et al. | 310/71 |
| 4,225,800 | 12/1980 | Magnaghi | 310/260 |
| 4,275,319 | 6/1981 | Davis, Jr. | 310/43 |
| 4,320,224 | 3/1982 | Rose et al. | 528/125 |
| 4,344,006 | 8/1982 | Mendelsohn | 310/43 |
| 4,394,417 | 7/1983 | Hilker | 428/383 |
| 4,469,967 | 8/1984 | Grierson et al. | 310/71 |
| 4,471,247 | 9/1984 | Cotton | 310/45 |
| 4,489,130 | 12/1984 | Hilker | 428/378 |
| 4,607,181 | 8/1986 | Smith | 310/87 |
| 4,612,246 | 9/1986 | Goldberg et al. | 428/379 |

FOREIGN PATENT DOCUMENTS

1047297 12/1958 Fed. Rep. of Germany ...... 310/270

OTHER PUBLICATIONS

*Chemical Abstract*—106:68445m.
*Chemical Abstract*—104:131629a.
*Chemical Abstract*—105:174603a.
*Chemical Abstract*—94:84759f.
IEEE, Conference Paper No. CP 63-500.
*Modern Plastics*, Dec., 1986, p. 84.
*Modern Plastics*, "'Unmatched Performance' Sparks a Buildup in Ketone Resins", Apr. 1987, pp. 46-48.
*Materials Engineering*, Dec. 1985, pp. 138 and 144.
"Polyethersulfone (PES) and Polyetheretherketone (PEEK) Two High Temperature Thermoplastics," Proceedings of the 15th Electrical/Electronics Insulation Conference, 1981.
"Long Term Evaluation of Self Bonding Magnet Wire for Hermetic Motor System", Proceedings of the 16th Electrical/Electronics Insulation Conference, 1983.
Rejda, L. J. et al., *Industrial Motor Users' Handbook of Insulation for Rewinds*, pp. 63-68.
Okubo, N. et al., "Properties of Various Plural Coated Magnetic Wires for Hermetic Motors", IEEE No. 73CH0777-3EI-26, pp. 11-15.
American Standard Definitions of Electrical Terms.
*Webster's Ninth New Collegiate Dictionary*, 1986, p. 1175.
*Pumping Manual*, 7th Edition, R. H. Warring, 1984, pp. 148-153, 226-229, 378, 379, 386-389.

*Primary Examiner*—Peter S. Wong
*Assistant Examiner*—D. Rebsch
*Attorney, Agent, or Firm*—Shapiro and Shapiro

[57] ABSTRACT

An oil-filled, high temperature, submergible electric pump motor comprises an unvarnished stator structure having stator windings formed of conductors coated with hydrolytically stable, oil-resistant, and abrasion-resistant insulation exposed to the oil of the motor, and preferably selected from the group consisting of PEEK, PEK, and PBI. The stator windings have end turns mounted on rigid, hydrolytically stable, oil-resistant electrically insulating blocks that support the weight of the stator windings and immobilize the end turns. The end turns are attached to the blocks by hydrolytically stable, oil-resistant electrically insulating tape. Other components of the insulation system are selected for their hydrolytic stability and oil resistance, and in some instances for their non-abrasive properties. For most applications contemplated by the invention, critical components of the insulation system have a dielectric strength on the order of 300 to 400 volts/mil and a continuous use temperature on the order of 400° F.

12 Claims, 4 Drawing Sheets

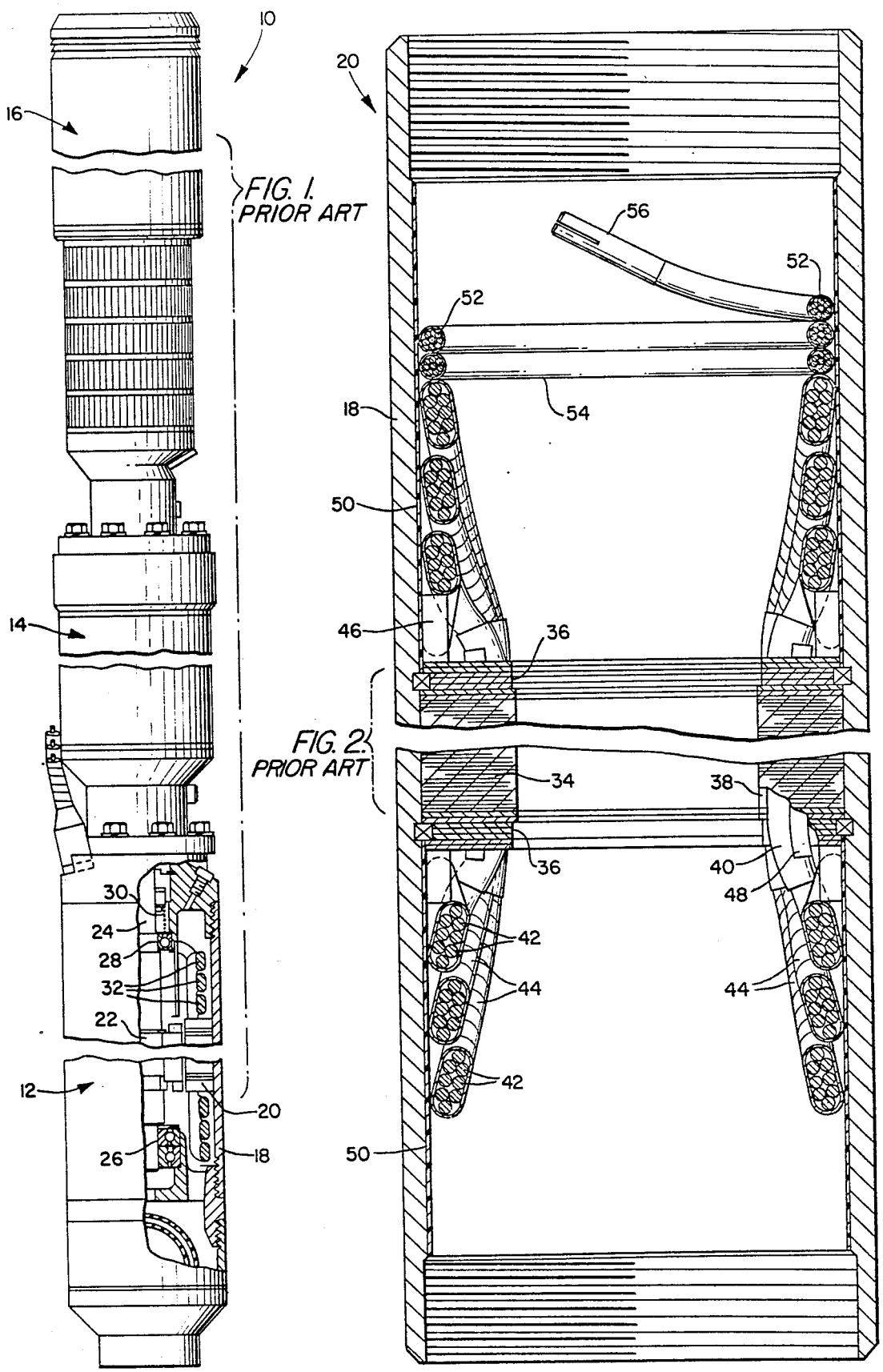

OIL-FILLED SUBMERGIBLE ELECTRIC PUMP MOTOR WITH UNVARNISHED STATOR STRUCTURE

BACKGROUND OF THE INVENTION

This invention relates to submergible electric pump motors and is particularly concerned with improvements in high temperature oil-filled motors.

For many years submergible pump units have been employed in the pumping of oil or water from wells. Representative submergible pump units are disclosed, for example, in U.S. Pat. Nos. 1,951,919; 1,970,484; 2,001,649; 2,236,887; 2,251,816; 2,270,666; 2,315,917; 3,672,795; and 4,275,319, all assigned to the assignee of the present invention. Typically, a submergible pump unit comprises an electric motor and a centrifugal pump suspended colinearly in a well by tubing or cable. The motor is filled with an oil that serves to lubricate moving parts, insulate electrical parts, cool the motor, and exclude the ambient well fluid from the interior of the motor. A protector containing oil accommodates the thermal expansion and contraction of the oil that results from the running and non-running cycle of the motor.

Submergible electric pump motors are expensive. When they fail in service, the pump unit must be pulled from the well, which is an expensive procedure. Accordingly, sophisticated insulation systems are employed in the pump motors to minimize electrical breakdowns. For example, the stator insulation system of one type of submergible motor sold by the assignee of the present invention includes insulating sleeves and insulating laminations at opposite ends of the stator, insulating slot liner tubing for the stator windings, multiple layers of insulation on the magnet wire of the windings, insulating tape on the end turns of the windings, insulating sleeves on the connections to the end turns, and an insulating varnish that impregnates the entire internal stator structure. The improved insulation system disclosed in U.S. Pat. No. 4,275,319 (referred to earlier) greatly increases the mean time to failure of prior insulation systems. Nevertheless, in the harsh environment of high temperature wells, even this improved insulation system has not provided the desired useful life of submergible motors.

It has been standard practice in oil-filled submergible motors to include a varnish in the stator insulation system. The invention of the aforesaid U.S. Pat. No. 4,275,319 relies upon an improved hydrolytically stable varnish to extend the life of the motor. The varnish impregnates substantially the entire stator system and serves as a moisture barrier to protect the magnet wire insulation from hydrolytic attack. In a conventional manner, the varnish also serves as a secondary electrical insulation for the electrical conductors of the stator, supports the weight of the stator windings, and encapsulates the end turns of the stator windings so that they are substantially immobilized.

The use of varnish in the stator insulation system is a mixed blessing, however. The varnish impregnation process is an expensive, labor and capital intensive operation. The varnish tends to degrade in use, causing contamination of the oil that fills the motor. Moreover, repeated thermal expansion-contraction cycling that occurs during the operation and shut-down cycles of the motor cracks the varnish and ultimately leads to electrical failure of the motor. Other problems associated with the use of varnish will be considered later.

BRIEF DESCRIPTION OF THE INVENTION

The present invention is the culmination of an extensive investigation with the aim of constructing an oil-filled submergible electric motor having an unvarnished stator structure. Although its stator structure is devoid of varnish, the motor of the present invention offers substantially better performance than has heretofore been possible, particularly in high temperature environments. Furthermore, the invention achieves greatly extended motor life, as well as higher operating temperature ratings for a given motor life.

Briefly stated, the invention provides an oil-filled submergible electric pump motor comprising an unvarnished stator structure having stator windings formed of conductors coated with hydrolytically stable, oil-resistant, abrasion-resistant insulation that is exposed to the oil in the motor, the windings having end turns supported by hydrolytically stable, oil-resistant electrically insulating means for substantially immobilizing the end turns.

BRIEF DESCRIPTION OF THE DRAWINGS

The invention will be further described in conjunction with the accompanying drawings, which illustrate a preferred (best mode) embodiment, and wherein:

FIG. 1 is a contracted longitudinal sectional view of a submergible pump unit in which the present invention may be employed;

FIG. 2 is a contracted longitudinal sectional view of the stator structure of an oil-filled submergible electric pump motor of the prior art;

DETAILED DESCRIPTION OF THE INVENTION

Figure 3:
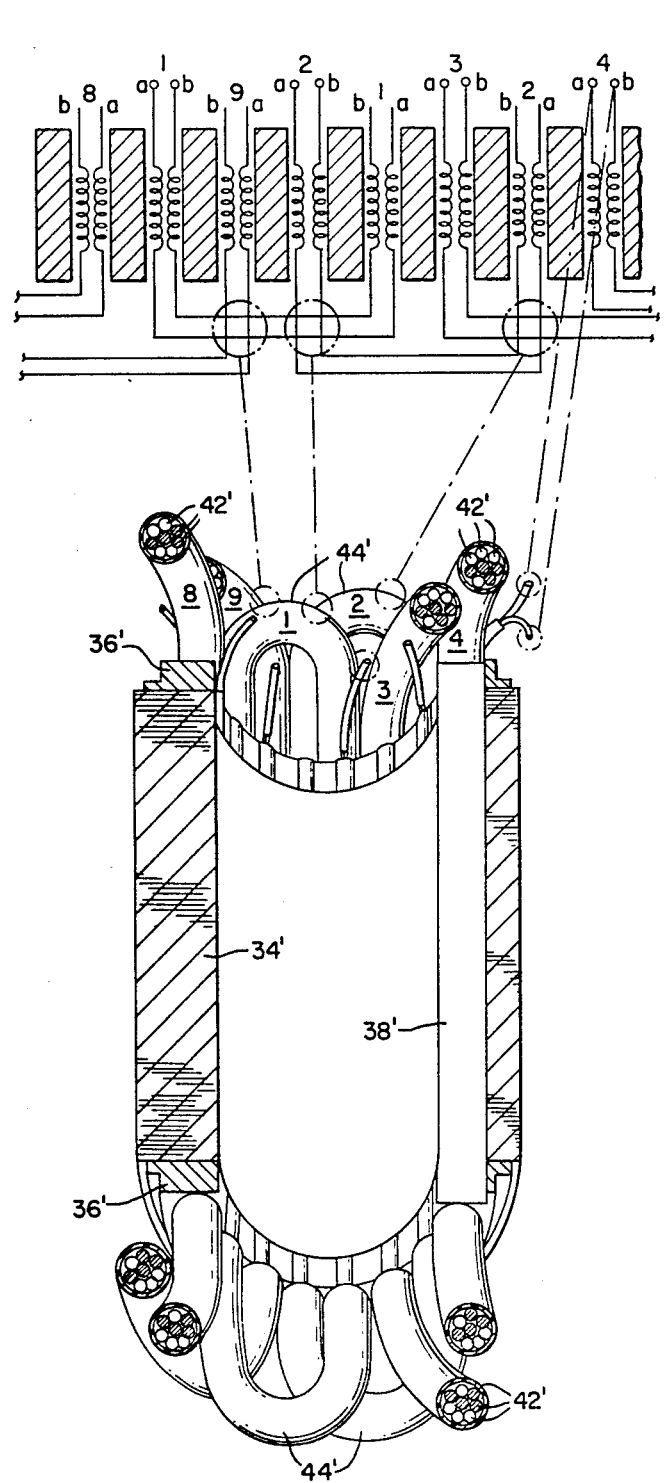
FIG. 3 is a perspective view of a longitudinally sliced statorette employed in testing the invention, the statorette being shown in conjunction with a diagram illustrating the arrangement of the windings employed for test purposes.

Before the invention is described in detail, it is appropriate to consider the general environment of the invention, and to describe a prior art stator structure in detail.

FIG. 1 illustrates a typical submergible pump unit 10 in which the present invention may be employed. The pump unit comprises an oil-filled submergible electric motor 12, a motor protector 14, and a pump 16, which may be of the centrifugal type. The motor comprises a tubular metal housing 18, a stator structure 20 mounted interiorly of the housing, and a rotor 22 having a rotor shaft 24, the rotor being supported for rotation coaxially within the stator by means of bearings 26 and 28. As is conventional, the interior of motor 12 is filled with an oil, such as a water white (all hydrocarbon) mineral oil or a synthetic hydrocarbon oil (particularly useful in geothermal or other high temperature environments). The motor shaft has a section extending through protector 14 and coupled to the impeller shaft of pump 16.

Protector 14 also contains oil and communicates with the interior of the motor to accommodate expansion and contraction of the oil in the motor in a well known manner. Alternatively, or in addition, the motor may be provided with a pressure compensating expansible chamber. The motor is sealed against entry of the ambient well fluid, and one or more mechanical seals 30 are provided to prevent leakage of well fluid along the motor shaft and into the motor. The winding structure 32 of the motor is shown somewhat diagrammatically. Typically, the motor may be a three-phase squirrel-cage induction motor, with the stator windings 32 providing the motor field. The pump unit may be suspended in the well fluid by tubing threaded onto the upper end of the pump, and the pump may discharge through the tubing. Alternatively, the pump unit may be a cable suspended unit, and, if desired, the pump may discharge through a liner. Various types of submergible pump units are well known, and pump unit 10 is merely an example of a submergible pump unit in which the invention may be employed.

FIG. 2 illustrates, in greater detail, a stator structure of the prior art. The stator structure comprises a stack of steel laminations 34 at opposite ends of which are electrically insulating laminations 36. In the usual manner, the laminations are perforated to provide longitudinal slots, such as the slot 38, spaced about the circumference of the stator. Each slot contains a slot liner 40, which may be in the form of fluorinated ethylene propylene copolymer thin wall tubing. Insulated magnet wire conductors 42 are inserted in the slot liners to form the stator windings, the pattern of the windings depending upon the type of motor, as is well known. Glass tape 44 is wrapped about the conductors 42 where they emerge from the slot liners and is usually in the form of a woven glass cloth that binds the emerging wires together to form a strong structure that will resist the electromechanical forces exerted on them during motor operation.

The conductors 42 may be a tape-wrapped wire, for example, in which a copper wire is covered with an aromatic polyimide tape, such as Kapton (sold by Dupont). The surface of the tape facing the conductor is coated with a fluorinated ethylene propylene copolymer, Teflon FEP, which serves as a hot melt adhesive. The Kapton tape is wrapped tightly about the copper conductor in an overlapped helical fashion and a second layer of the tape is applied in a similar fashion over the first layer. The Kapton tape is bonded to the wire and itself by the application of heat.

A coil forming block 46 is employed as a mechanical aid to provide the desired curvature of the wires in the first-formed end turn. Wedges 48, which may be half-round pieces of aramid sheet material (such as Nomex), are forced down into the slots 38 after the wires are in place to hold the winding wires in the slots mechanically. Electrically insulating sleeves 50 line the interior of the ends of the housing 18 and separate the end turns from the housing. Lead wires 52, electrically insulated with tubing 54, are soldered or otherwise connected to the stator windings 42. A connector 56 at the end of each of tee lead wires serves to connect the stator windings to a power cable (not shown) or to a succeeding stator section (where stacked sections are employed). The stator structure also commonly includes mousing wire, Nylon cord, additional insulating sleeving or "spaghetti" and other well known parts.

Another, most important component of the insulation system of the prior art stator structure is a varnish that impregnates the interior of the stator. A common type of varnish employed heretofore in stators of the type shown is a solvent diluted, heat curable, baking varnish containing a heat curing phenolic resin which has been modified with an isophthalic alkyd type saturated polyester, an example of which is Hi-Therm BC-325, Class F, sold by John C. Dolph Company of Monmouth Junction, N.J. Oil-filled submergible electric pump motors having stators of the type shown in FIG. 2 and impregnated with such varnish were sold for many years by the assignee of the present invention and are widely used. Similar motors sold by other manufacturers are also in common use.

In more recent years, motors sold by the assignee of the present invention have employed an improved, hydrolytically stable varnish of the type disclosed in the aforesaid U.S. Pat. No. 4,275,319, which has greatly increased motor life. The use of such a varnish, based upon polybutadiene compositions, provides a water-resistant barrier about the insulation of the stator. Water, of course, is present in almost all oil environments, and despite the filling of submergible motors with oil and efforts to seal the interior of the motor from the ambient well fluid, leakage of water into motors has continued to be a serious problem. Improved seals and sealing techniques have mitigated the water leakage problems somewhat, but after prolonged use, some water inevitably enters the motor.

As long as the hydrolytically stable varnish remains intact, the insulation of the magnet wire forming the stator coils is protected from hydrolysis. However, as indicated earlier, on-off cycling of the motor causes thermal expansion and contraction that eventually leads to cracking of the varnish, exposing the insulation of the magnet wire to hydrolytic attack and ultimately leading to electrical failure of the motor.

If the insulation of the magnet wire itself were hydrolytically stable, it would not be necessary to employ varnish to protect the magnet wire insulation from hydrolysis. Conventional magnet wire insulation (described earlier) is not hydrolytically stable, however. Recently magnet wire insulated with hydrolytically stable insulation has become available, raising the possibility that the use of such magnet wire for the stator windings of an oil-filled submergible motor could eliminate the need for varnish protection. However, the varnish conventionally serves important functions in addition to protecting the magnet wire insulation against hydrolytic attack. These additional functions include supporting the weight of the magnet wire windings, providing secondary electrical insulation and encapsulating and immobilizing (stabilizing) end turns of the windings. Furthermore, the improved varnish of U.S. Pat. No. 4,275,319 not only protects the magnet wire insulation from hydrolysis; it also protects other components of the insulation system that are susceptible to hydrolytic attack, including phase barriers (a Nomex-Kapton-Nomex lamination, for example), insulating sleeves (Nomex, for example), and end turn tape (fiberglass, for example). Hence, the use of hydrolytically stable magnet wire insulation would not in itself permit the elimination of the varnish.

The present invention provides a specially designed stator structure which avoids the need for varnish. The general configuration of the stator structure employed in the invention is similar to that of the prior art stator structure illustrated in FIG. 2, but differences will become apparent hereinafter.

First of all, the stator structure of the present invention, unlike the stator structure of the prior art, employs magnet wire insulation that is both hydrolytically stable and oil-resistant at operating conditions of the motor. The insulation must have both properties, because in use it will come into contact with the oil that fills the motor and with water that ultimately enters the motor.

Hydrolytic stability is the ability to withstand water and water vapor above the boiling point without deterioration of chemical structure and without significant loss of physical and electrical properties. Oil resistance is the ability to withstand exposure to oil without significant deterioration of either chemical structure or physical and electrical properties.

For the purposes of the invention, the magnet wire insulation must also be hard and abrasion-resistant, yet flexible enough to be formed into tight "U-bends". Abrasion resistance is the ability to withstand rubbing or sliding friction without appreciable effect. The magnet wire insulation must be abrasion-resistant, because even though the stator windings are mechanically supported (as disclosed in detail hereinafter), some abrasive action cannot be eliminated. Conventional magnet wire insulation (described earlier) has poor abrasion resistance. The magnet wire insulation must have sufficient flexibility to withstand repeated bending and forming during winding of the stator coils without cracking, tearing or loss of dielectric strength. The magnet wire insulation must have a dielectric strength that is sufficient for the operating voltages employed and must have a continuous use temperature that is high enough for the temperatures to be encountered.

Materials suitable for the magnet wire insulation of the invention include polyetheretherketone (PEEK), polyetherketone (PEK), and polybenzimazole (PBI), PEEK being most preferred. For example, PEEK coated magnet wire employed in the invention may be annealed solid round copper wire ASTM B3 sizes 7 to 14 coated with crystalline or amorphous PEEK continuously extruded about the copper conductor without voids, holidays, blisters or foreign matter, to a coating thickness of 0.006 in. per side, with total build-up of about 0.012 in. This insulation has a dielectric strength of about 400 volts/mil (ASTM D149) and a continuous use temperature of about 400° F. Minimum breakdown voltage is 8000 volts. For most motor operating conditions contemplated by the invention, a dielectric strength of at least about 400 volts/mil and a continuous use temperature of at least about 400° F. are suitable. PEEK insulated magnet wire is available from ICI Petrochemicals and Plastics Division of Imperial Chemical Industries PLC (as Victrex PEEK), for example. PEEK has an abrasion resistance of 11 mg/1000 cycles, PBI an abrasion resistance of 11 mg/1000 cycles, and PEK an abrasion resistance of 3.0 mg/1000 cycles. The foregoing abrasion resistance value for PEK appears in Materials Engineering Materials Selector 1988, published by Penton Publishing, Inc. The values for PBI and PEEK were obtained in the laboratory of the assignee according to ASTM D4060, using CS10 wheels and 1000 gram weights. Preferably, the abrasion resistance of the magnet wire insulation should be 25 mg/1000 cycles or less.

As is apparent from the foregoing description, the magnet wire insulation employed in the invention must have a combination of certain properties. Materials that do not appear to have the required combination of properties, and are therefore deemed unsuitable for the magnet wire employed in the invention, include polyether sulfone (PES), polyimides, polyamidimide (Torlon), Nylon, polyesters, PVC, epoxies, perfluoroalkoxy (PFA), tetrafluoroethylene (TFE), and fluorinated ethylene propylene (FEP).

Essential to the elimination of the varnish is the provision of some other means for supporting the weight of the stator windings and for substantially immobilizing (stabilizing) the end turns of the windings. In accordance with the present invention these functions are performed by support blocks and by tape that attaches the end turns of the stator windings to the support blocks.

In the prior art motor shown in FIG. 2, a coil forming block was used to form and locate an end turn of a first stator winding, which has to be compressed with a short bending radius. In accordance with the present invention, however, blocks are employed to support and stabilize all of the end turns of the stator windings and also to provide a coil forming block for the first end turn.

The blocks of the invention support the weight of the magnet wire windings and substantially immobilize the end turns. Although the windings may still move slightly in operation of the motor, any such movement is highly restricted. The blocks must be hydrolytically stable, oil-resistant electrical insulators having an appropriate dielectric strength and continuous use temperature. A dielectric strength of at least about 300 volts/mil (ASTM D149) and a continuous use temperature of at least about 400° F. are sufficient for most conditions contemplated by the invention. The blocks must remain rigid at the operating temperature. Suitable block materials include polyphenylene sulfide (Ryton), PEEK, Teflon, and PBI. The most preferred material is Ryton, followed by PEEK, PEK and Teflon. Ryton is available from Phillips Chemical Company of Bartlesville, Okla. Some ceramics, phenolics, and epoxies may be used. Most epoxies, PES, Torlon, Nylon, polyimides and most other plastics do not combine the required properties of hydrolytic stability, oil resistance, rigidity, dielectric strength, and continuous use temperature.

Figure 4:
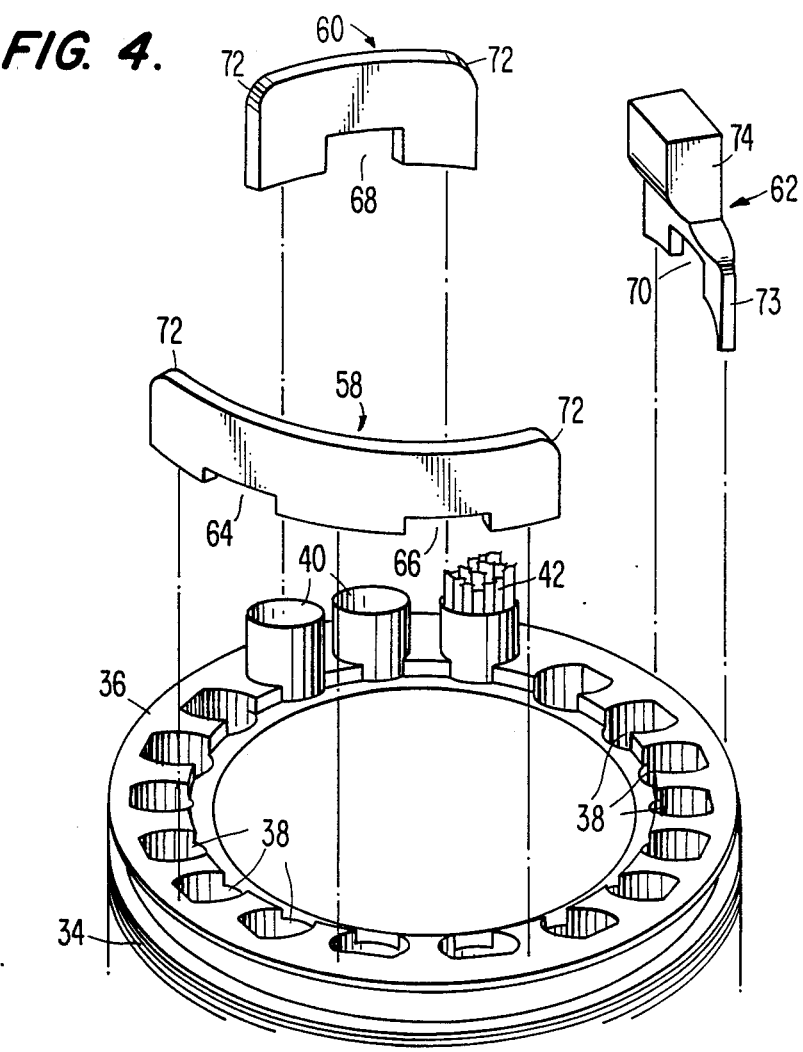
FIG. 4 is an exploded perspective view illustrating end turn support blocks and other portions of one end of the stator structure employed in the invention.

Blocks of the type employed in the invention are shown in FIG. 4. As shown, three blocks 58, 60, and 62 are employed. Blocks 58 and 60 have an arcuate contour to match the circumferential contour of the end laminations 36. Block 58 is somewhat longer circumferentially than blocks 60 and 62. Block 58 has a pair of spaced notches 64 and 66, while blocks 60 and 62 have a single notch, 68 or 70. Blocks 58 and 60 are generally rectangular (but somewhat curved as noted above) and have smoothly curved corners 72. Block 62 has a base portion 73 generally similar to block 60 but of less circumferential length, so that the base portion 73 may be substantially flat, rather than arcuate. Block 62 has an enlargement 74.

Figure 5:
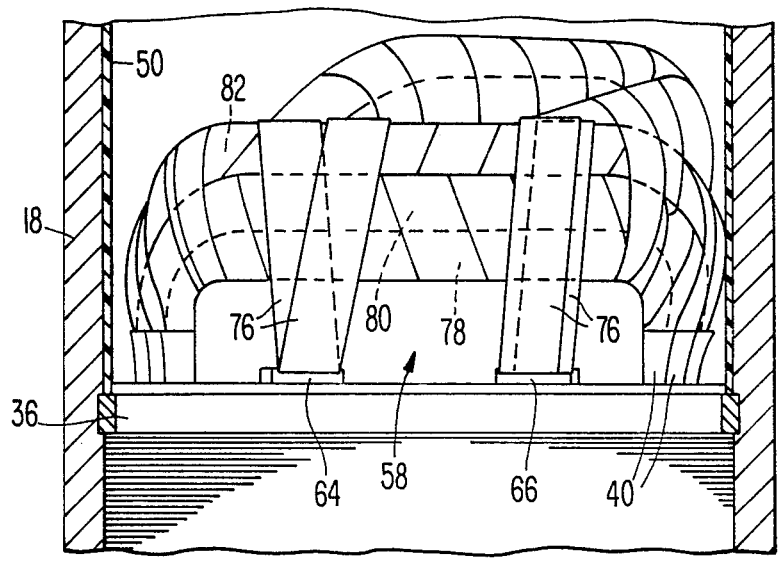
FIGS. 5-7 are fragmentary longitudinal sectional views illustrating portions of one end of a stator structure employed in the invention as seen from different points of view approximately 120° apart about the circumference of the stator structure.
Figure 6:
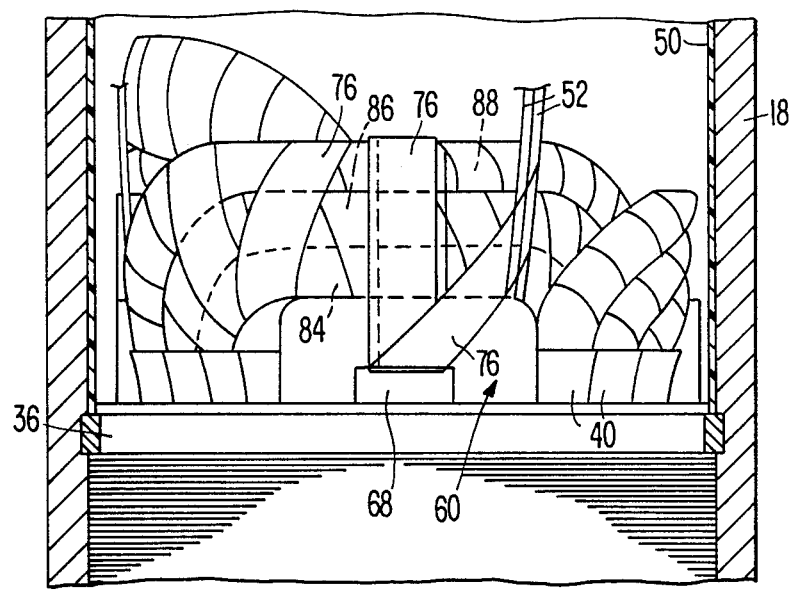
Figure 7:
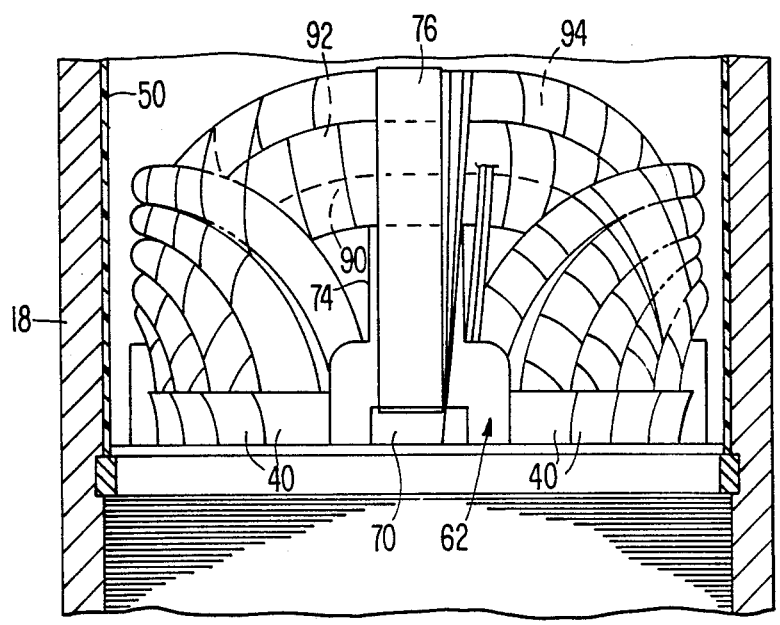

As shown in FIGS. 5–7, the end turns of the stator windings are attached to the support blocks by tape 76. The tape is used to secure the insulated magnet wire conductors of each end turn as a bundle, to secure end turns to support blocks, to secure end turns to each other, and to form phase barriers. The tape must be hydrolytically stable and oil-resistant. A dielectric strength of at least about 300 volts/mil (ASTM D149) and a continuous use temperature at least about 400° F. are sufficient for most operating conditions contemplated by the invention. The tape should have sufficient tensile strength, preferably 3000 psi or greater, and it should also have sufficient elasticity to permit some stretching of the tape in use and to provide a recoil force insuring that the tape remains under tension in a wrapped condition. Non-adhesive Teflon tape is preferred, but tapes of PEEK, PEK, or PBI may be used. The fiberglass tape employed in prior art motors to secure a single end turn to a coil forming block is not useful in the invention, since such tape does not have the required combination of properties. The usual types of rubber and PVC plastic tapes are not useful either.

The stator windings are, in general, wound in the same manner as the stator windings of the prior art stator structure illustrated in FIG. 2. Insulated magnet wire conductors 42 are wound (preferably continuously) through the slot liners 40 of pairs of stator slots 38 to form bundles of conductors that constitute the stator coils. Part of one such bundle is shown fragmentarily in FIG. 4.

In the manufacture of the stator of a three-phase induction motor of the invention, a first bundle of conductors wrapped helically with tape 76 to form an end turn 78 of a first coil of a first phase is formed about the block 58 as shown in FIG. 5. The end turn 80 of a second coil of the first phase is wrapped with tape and is then wrapped with tape integrally with the end turn 78. The end turn 82 of a third coil of the first phase is wrapped with tape, and then all three end turns of the coils of the first phase are secured to the block 58 by tape wrapped about the three end turns and through the notches 64 and 66 as shown in FIG. 5. A similar procedure is conducted at the opposite end of the stator structure, where blocks identical to those shown in FIG. 4 are provided to support the end turns at that end of the stator structure. When, during the winding of the stator coils, the conductors of the stator coils are wound tightly through the stator slot liners and around the ends of the stator, the end turns at the opposite ends of the stator structure are pulled tightly against the respective blocks 58, so that the support blocks are drawn into engagement with the end laminations.

As shown in FIG. 6, a similar coil winding and wrapping procedure forms end turns 84, 86, and 88 of three coils of the second phase, wraps the end turns with tape, and ties the end turns to support block 60 (by means of tape wrapped around the coils and through the slot 68). The same procedure is carried out at the opposite end of the stator, so that the end turns are drawn tightly against the respective support blocks 60 at opposite ends of the stator structure and the support blocks are drawn tightly against the end laminations.

Finally, three end turns 90, 92, and 94, of three coils of the third phase are formed and secured in the same manner, as shown in FIG. 7. In this case, the greater distance of the end turns from the end laminations requires that the end turns be supported on the enlargement 74 of the block 62, by means of tape that is wrapped about the end turns and through the slot 70. Again, the same procedure is followed at the opposite end of the stator, so that the end turns are drawn tightly against the blocks 62 at opposite ends of the stator structure and the blocks are drawn tightly against the end laminations.

Electrically insulating sleeves 50 are also employed in the present invention, but instead of using Nomex sheet material, which is not hydrolytically stable, the insulating sleeves are formed of Teflon, PEEK, PEK, Ryton, or PBI, for example. Teflon is most preferred, followed by PEEK. Some phenolics may be employed. In addition to being hydrolytically stable, the material must be oil-resistant. Nomex, Kapton, and most epoxies are not suitable. The material of the insulating sleeves must have an appropriate dielectric strength and continuous use temperature. For most operating conditions contemplated by the invention, a dielectric strength of at least about 300 volts/mil (ASTM D149) and a continuous use temperature of at least about 400° F. are sufficient.

In the prior art motor illustrated in FIG. 2, Nylon string (not shown) is used to tie the motor leads in position during assembly of the motor so that they do not come in contact with the rotating shaft or shaft coupling. Nylon is too abrasive to be used in the present invention. The motor lead ties employed in the invention should be non-abrasive as well as hydrolytically stable and oil-resistant. For most operating conditions contemplated by the invention, a dielectric strength of at least about 300 volts/mil (ASTM D149) and a continuous use temperature of at least about 400° F. are sufficient. A tensile strength of at least 3000 psi is desirable. Thin Teflon, PEEK, or PEK tapes are suitable, the preferred material being Teflon. Tape is preferred over a filament string because of the wider contact area.

In the present invention, the separate phase barriers employed in the prior art stator structure of FIG. 2 are not needed, because the tape wrapped about the end turns acts as phase barriers. Also, the wedges 48 employed in the stator structure of FIG. 2 are not necessary, because the weight of the stator windings is borne by the support blocks. Any mousing wire, additional insulating sleeving or "spaghetti" or other components employed in the stator structure must be hydrolytically stable and oil-resistant and must have an appropriate dielectric strength and continuous use temperature.

To facilitate the testing of the new stator insulation system in accordance with the invention, as well as a standard system referred to earlier with reference to FIG. 2 and including a varnish of the type disclosed in the aforesaid U.S. Pat. No. 4,275,319, multiple units of a device termed a "statorette" were built. In essence, each statorette is a miniature version of the stators actually employed in oil-filled submergible electric pump motors, but with a winding pattern constructed to facilitate electrical testing. FIG. 3 illustrates half of a statorette that has been sliced longitudinally. The statorette comprises a stack of steel laminations 34', insulating end laminations 36', stator slots 38', and nine separate windings or test coils 1-9, each a bifilar winding a, b and each having eight turns. The conductors 42' of the windings are inserted in slot liners, and the end turns are wrapped in glass cloth tape 44' in the case of the standard insulation system and Teflon tape 44' in the case of the invention. The shading of some conductor ends distinguishes a from b. Only one end of each conductor pair must be accessible. Some of the accessible conductor ends have been encircled in the figure. The winding pattern is shown diagrammatically at the top of FIG. 3, with the cross-over points (and some accessible conductor ends) correlated in the upper and lower portions of the figure. Except for the winding pattern, the bifilar windings are essentially the same as in an actual stator. The insulation materials are those employed in actual stators. Conventional magnet wire (described earlier) was used in the case of the standard insulation system, and PEEK coated magnet wire was used in the case of the invention.

In the particular thermal aging tests described hereinafter, a group of standard statorettes was vacuum impregnated with the standard polybutadiene varnish employed in prior motors as described earlier, and a group of statorettes in accordance with the invention was left unvarnished. The statorettes were subjected to a voltage proof test (before and after impregnation in the case of the standard statorettes) to eliminate effects of any mechanical damage which might have occurred during the winding. Then the statorettes were tested in accordance with a test cycle derived from the guidelines set forth in IEEE Standard 98-1972. Each statorette was placed in a 2-liter Parr chemical autoclave (bomb), which was employed as the aging chamber, the temperature of which could be adjusted. Aging tests were performed at nominal temperatures of 185° C., 210° C., and 235° C. The bombs were filled about three-fourths full with standard motor oil (just sufficient to cover the uppermost end turns), and a glass test tube containing approximately 60 milliliters of distilled water was placed in the bore of the statorette. This amount of water was sufficient to ensure that at all times the system would be completely saturated with water and have an excess of liquid water present, thereby simulating the environment in a motor which has leaked.

An estimate was made of how long a given statorette might be expected to last before failing, and the heat aging was interrupted at a time corresponding to about one-tenth of the estimated mean time to failure. The bomb containing the statorette was then cooled to room temperature and placed in a −40° C. freezer overnight. Then it was removed from the freezer and allowed to warm t room temperature, after which the statorette was removed from the Parr bomb and subjected to voltage proof tests to determine the integrity remaining in the dielectric system.

The electrical tester employed was a Hipotronics 30 KV, 60 Hz dielectric tester. The test voltages employed in the electrical testing of each cycle of the thermal aging test were set to be about 10% higher than the highest voltage ever to be expected in actual use of a motor. Three kinds of voltage tests were employed. In one test a voltage of 500 volts RMS was applied between the two wires which comprise a bifilar winding. This placed a voltage stress across the insulating film on the two lengths of wire (each approximately 6 feet long) involved in the particular bifilar coil. A second type of voltage test was the application of a voltage of 3500 volts RMS between both wires of one of the bifilar coils and the stator laminations. This placed a voltage stress across the wire insulating film and the slot liner material in series. Both conductors of the bifilar coil were tied in parallel for this test. A third test was the application of a voltage of 3500 volts RMS between two adjacent bifilar coils. In other words, the two wires in coil 1, for example, were connected in parallel, the two wires in coil 2, for example, were connected in parallel, and a voltage was applied between these two coils. Stator iron was floating during this test, and the voltage test was applied essentially across the end turns of the coils. This test placed a voltage stress between end turns at the cross-over points.

From the foregoing tests, an assessment of the integrity of the magnet wire insulation, the ground insulation, and the insulation on the end turns could be made. A leakage current of more than 15 milliamperes was considered as a failure reading. A failure (voltage breakdown) in any one of the three voltage tests was considered to be a failure of the test sample.

After the completion of the voltage testing part of each test cycle, the statorette was replaced in the Parr bomb, and heat aging was continued for a period of time equal to the first aging period. Cyclic aging and electrical testing were continued to determine the actual life before failure.

In analyzing the test data generated, IEEE Standard 101-1972 Guide For the Statistical Analysis of Thermal Life Test Data was followed quite closely. Briefly, the times to failure at a given temperature were analyzed statistically and fitted to an appropriate statistical distribution. From the statistical analysis of the distribution of time to failure at a given temperature, the time to a 50% probability of failure was derived.

The laboratory tests show a time to a 50% probability of failure for the insulating system with the standard varnish and magnet wire of 2284 hours at 235° C. where the pressure in the bomb is 460 psia. After 14,458 hours of aging time at 235° C., there have been no failures in an unvarnished statorette using PEEK coated magnet wire. For the statorettes of the invention, a 50% probability of failure at 235° C. in water saturated oil has been determined to be at least 100% greater than 2,284 hours, i.e., 4,568 hours. The test results clearly demonstrate a superior life of oil-filled submergible electric pump motors manufactured in accordance with the invention.

Another laboratory test used an unvarnished and a varnished motorette (a motorette is a single rotor motor as described earlier but without the housing 18 in FIG. 2), running at 330° F. in a locked rotor condition. The motorettes cycled 64,000 times without electrical failure. This test puts extreme stresses on the end turns. The energizing of the stator windings is held for 10 seconds and then released for 60 seconds. It is cycled this way until failure occurs or a sufficient number of cycles are completed, to assure end turn movement will not lead to motor failure. A standard varnished motorette was tested in parallel with the unvarnished motorette and no failures occurred in either motorette for the same number of cycles, but the varnished motorette ran 10°–15° F. higher in temperature.

A 50 horsepower 540 Series TRW Reda motor was fabricated according to this invention, placed in an engineering test well, and run in conjunction with a standard varnished 540 series motor. These motors were tested (locked rotor) at 200° F. in water at a full voltage of 1370 volts drawing 23 amps at 60 Hz. Temperature calculations showed the varnished motor to be 12° F. higher in the windings than the unvarnished motor. Both motors cycled more than 10,000 times without failure. This is considerably more starts and stops than a motor will see in actual use (less than 100). Finally, a 160 horsepower 115 volt 540 series motor was built according to this invention and put into service in a manufacturing test well as a slave motor to test pumps. This motor ran 672 hours with 165 starts and stops until a bearing failure terminated the test.

By virtue of the invention, the time and expense of impregnating the stator structure with varnish are eliminated. Electrical failures due to varnish cracking are also eliminated. An unexpected benefit of the unvarnished stator structure is that the motor actually runs substantially cooler, because the oil filling the motor is in direct contact with the magnet wire insulation and circulates freely through the slots of the stator and around the end turns of the stator windings. The invention greatly extends the service life of motors operated at the same temperatures at which prior art motors are operated and permits a lower cost motor to operate at even higher temperatures than has heretofore been possible.

The elimination of the varnish also removes an important source of motor oil contamination. As the varnish ages in service, it tends to degrade physically and to allow small flakes or particles of varnish to be deposited in the oil. This degrades the lubricating and electrical insulating properties of the oil.

A further advantage of eliminating the varnish becomes apparent in the salvaging and rebuilding of a stator. An unvarnished stator is easily rewound without requiring the removal of varnish and the thorough cleaning of the stator that are necessary before a varnished stator can be rebuilt. The ease of wire removal from an unvarnished stator simplifies failure analysis, because the evidence of the failure is not destroyed during varnish removal.

Winding of the conductors of an unvarnished stator is facilitated by the absence of the conventional insulation wrapping of the magnet wire. The insulated magnet wire employed in the invention has a smooth surface and is easier to wind. Elimination of the wrapped insulation construction of the conventional magnet wire employed in a varnished stator also avoids a potential source o electrical failure. Movement of the magnet wire, which is both electrically and mechanically induced during the operation cycle of the motor, causes rubbing of the wrapped insulation material against itself or another material, with resultant wear, flaking, cracking, or general deterioration of the insulation, which eventually leads to an electrical failure. Moreover, the wrap seams of the insulating tape wrapped about the magnet wire provide an area of inherent weakness in the insulation system. All of this is avoided by the present invention.

Although unvarnished stators have been used in low temperature motors of low power rating, for water pumping, for example, such motors have been filled with water, and, at the lower temperatures and power ratings, the functions performed by the varnish employed in oil-filled motors have not been necessary. In oil-filled motors, varnished stators have been used for decades, and the varnish has been deemed to be an essential component of the stator insulation system. The present invention, proceeding contrary to the teachings of the prior art, has produced a clearly superior motor.

While a preferred embodiment of the invention has been shown and described, it will be apparent to those skilled in the art that changes can be made in this embodiment without departing from the principles and spirit of the invention, the scope of which is defined in the appended claims. For example, materials other than those specified may be used for the components of the insulation system of the invention provided that they have the required combination of properties specified. Filled (reinforced) versions of some materials may be employed if the filling is compatible with the properties required by the invention. Although the invention is principally concerned with motors that are intended for high temperature environments, such as 400° F., there may be occasions in which motors constructed in accordance with the invention are intended for lower temperature environments, such as 215° F. and above. In that case, the continuous use temperature of the various materials employed in the insulation system may be less than 400° F. Also, although the invention is principally intended for use in motors having an operating voltage that is high enough to require dielectric strengths of 300–400 volts/mil, for example, as specified, there may be occasions when materials having lower dielectric strengths will suffice, provided that the required combination of other properties, such as hydrolytic stability, oil-resistance, and abrasion-resistance, for example, is present.

The invention claimed is:

1. An oil-filled submergible electric pump motor comprising an unvarnished stator structure having stator windings formed by conductors coated with hydrolytically stable, oil-resistant, abrasion-resistant insulation that is exposed to the oil in the motor, said windings having end turns mounted on hydrolytically stable, oil-resistant electrically insulating means for substantially immobilizing said end turns.

2. A motor in accordance with claim 2, wherein the insulation of said conductors is selected from the group consisting of PEEK, PEK, and PBI.

3. A motor in accordance with claim 1, wherein the insulation of said conductors has a dielectric strength of at least about 400 volts/mil, and a continuous use temperature of at least about 400° F.

4. A motor in accordance with claim 1, wherein said electrically insulating means comprises a plurality of blocks supporting corresponding end turns of said windings, said blocks being attached to the corresponding end turns by hydrolytically stable, oil-resistant electrically insulating tape wrapped about the end turns and the blocks.

5. A motor in accordance with claim 4, wherein said blocks are substantially rigid and said tape is substantially elastic.

6. A motor in accordance with claim 5, wherein said blocks and said tape have continuous use temperatures of at least about 400° F. and wherein said tape has a dielectric strength of at least about 300 volts/mil.

7. A motor in accordance with claim 1, wherein said motor has a metal housing containing said stator structure and includes electrically insulating sleeves lining the interior of said housing about said end turns, said sleeves being hydrolytically stable and oil-resistant.

8. A motor in accordance with claim 1, wherein the stator structure has a 50% probability of failure of at least 4,568 hours at 235° C. in water-saturated oil.

9. An oil-filled submergible electric pump motor comprising an unvarnished stator structure having stator windings formed by conductors coated with hydrolytically stable, oil-resistant, abrasion-resistant insulation that is exposed to the oil in the motor, said windings having end turns mounted on hydrolytically stable, oil-resistant electrically insulating blocks and attached thereto by hydrolytically stable, oil-resistant electrically insulating tape wrapped about the end turns and the blocks, said blocks being substantially rigid and said tape being substantially elastic, said stator structure having a 50% probability of failure of at least 4,568 hours at 235° C. in water-saturated oil.

10. A motor in accordance with claim 9, wherein the insulation of said conductors has a dielectric strength of at least about 400 volts/mil and a continuous use temperature of at least about 400° F. and wherein said blocks and said tape have continuous use temperatures of at least about 400° F. and said tape has a dielectric strength of at least about 300 volts/mil.

11. A motor in accordance with claim 10, wherein said motor has a metal housing containing said stator structure and includes electrically insulating sleeves lining the interior of said housing about said end turns, said sleeves being hydrolytically stable and oil-resistant.

12. A motor in accordance with claim 10, wherein the insulation of said conductors is selected from the group consisting of PEEK, PEK, and PBI.

* * * * *